J. H. NONAMAKER.
Gate.

No. 64,133.

Patented April 23, 1867.

Witnesses:
Theo. Tusch
J. A. Service

Inventor:
J. H. Nonamaker
Per Munn & Co.
Attorneys

United States Patent Office.

J. H. NONAMAKER, OF MIDDLETOWN, PENNSYLVANIA.

Letters Patent No. 64,133, dated April 23, 1867.

IMPROVEMENT IN FARM-GATES.

*The Schedule referred to in these Letters Patent and making part of the same.*

TO ALL WHOM IT MAY CONCERN:

Be it known that I, J. H. NONAMAKER, of Middletown, in the county of Dauphin, and State of Pennsylvania, have invented a new and useful Improvement in Farm-Gate; and I do hereby declare that the following is a full, clear, and exact description thereof, which will enable others skilled in the art to make and use the same, reference being had to the accompanying drawings, forming a part of this specification, in which—

Similar letters of reference indicate like parts.

Figures 1, 2:
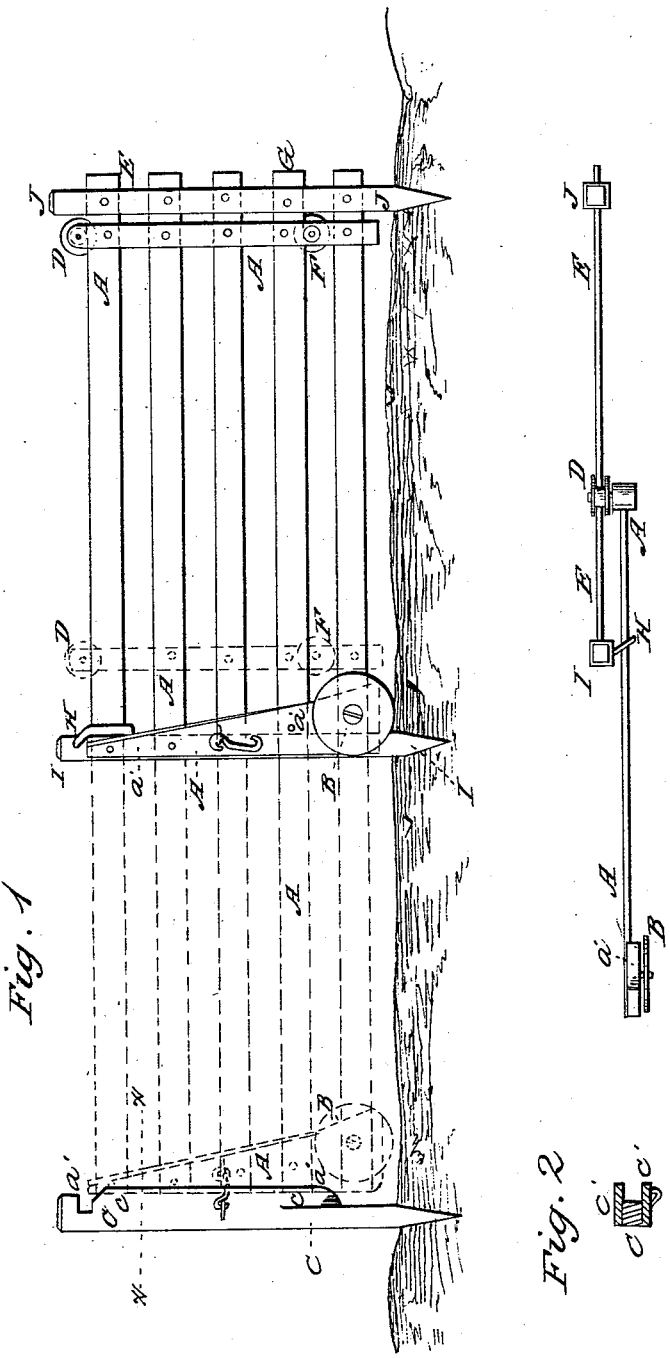
Figure 1 is a side view of my improved gate, showing in black lines the gate opened and in red lines the gate closed.
Figure 2 is a top view of the same partly in section, through the line $x\ x$, fig. 1, showing the gate partially opened.

My invention consists in attaching a large wheel to the side of the forward end of the gate; in attaching a stop and guide-hook to the fence post at the rear end of the gate; and in the combination and arrangement of the two grooved pulleys with the rear end of the gate and with the rails of the panel of the fence adjacent to the rear end of said gate.

A is the gate, about the construction of which there is nothing new. B is a wheel attached to the side of the forward end of the gate, as shown in figs. 1 and 2. This wheel should be from sixteen inches to two feet in diameter, so that it may move easily over the surface of the ground and not be liable to be clogged by mud or snow. By attaching the wheel B to the side of the gate I am enabled to make it of such a size as the circumstances of each case may require. The forward end of the gate when closed shuts into a vertical groove formed in the side of the ordinary fence post C. This groove may be formed by channelling the side of said post, or by attaching slats $c'$ to its side or sides, as may be most convenient. To the upper corner of the rear end of the gate is attached a pulley, D, the face of which is grooved so as to fit upon the upper edge of the top rail E of the adjacent panel of the fence. To the lower part of the rear end of the gate A is attached a pulley, F, the face of which is grooved to fit upon the lower edge of one of the lower rails, as G, of the adjacent fence panel. H is a stop-hook attached to the fence post I, at the rear end of the gate, in such a position that its lower end or hook may project downwards at the outer side of the upper rail of the gate, as shown in figs. 1 and 2, so that as the gate A is pushed back or open, the rear edge of the forward vertical bar $a'$ of the gate may strike against the said hook and stop the gate before the pulleys D and F can strike against the fence post J. The hook H also serves as a guide to keep the gate A in proper position while being opened and closed. By this construction and arrangement of the gate and its attachments no additional posts are required, and very little more timber, labor, and expense are required for the gate than would be required to construct a panel of an ordinary fence.

What I claim as new, and desire to secure by Letters Patent, is—

The combination and arrangement of the grooved pulleys D and F with the rear end of the gate A, and with the rails E and G of the panel of fence adjacent to the rear end of said gate, substantially as herein shown and described.

J. H. NONAMAKER.

Witnesses:
    YETMAN EVES,
    J. SCHAEFFER.